United States Patent Office 3,782,947
Patented Jan. 1, 1974

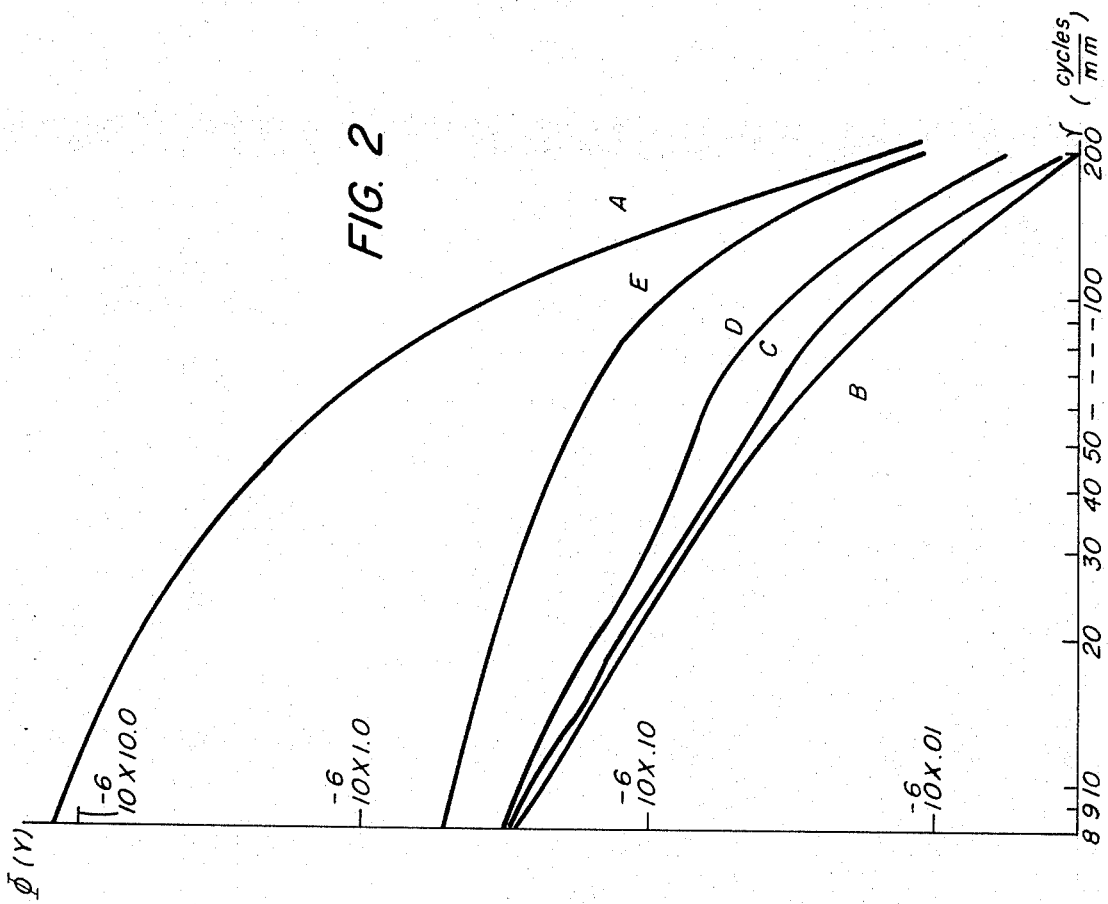

3,782,947
PHOTOGRAPHIC PRODUCT WITH PHOTOGRAPH-ICALLY TRANSPARENT MAGNETIC RECORDING MEDIUM
Harry J. Krall, Los Gatos, Calif., assignor to Eastman Kodak Company, Rochester, N.Y.
Continuation-in-part of abandoned application Ser. No. 122,147, Mar. 8, 1971. This application Jan. 28, 1972, Ser. No. 221,502
Int. Cl. G03c 1/76
U.S. Cl. 96—67    33 Claims

ABSTRACT OF THE DISCLOSURE

A photographic product carries magnetically susceptible particles which are uniformly distributed across (at least part of) the image area of the product. The particle distribution and size(s) are so designed that the composite granularities of the photographic and magnetic media is such that the magnetic distribution is essentially transparent in a photographic sense. Thus, the photographic image may be viewed via the magnetic distribution, and the magnetic distribution may be employed for recording and playback of information.

CROSS-REFERENCE TO RELATED APPLICATIONS

Reference is made to U.S. Ser. No. 122,147, now abandoned, filed on or about Mar. 8, 1971, of which this application is a continuation-in-part.

BACKGROUND OF THE INVENTION

Field of the invention

This invention relates to both magnetic recording and photographic media, and in particular to a product, or equivalent thereof, which so combines such media that the magnetic recording medium is transparent, in a photographic sense, and may thus be coated over, or beneath, or made part of, or used as a filter for, the photographic medium, while still retaining substantial utility for the photographic medium.

Description relative to the prior art

The aforesaid copending application Ser. No. 122,147 describes: (1) the prior practice of providing magnetic stripes on photographic film; and various problems associated therewith . . . and (2) the prior use (U.S. Pat. No. 2,950,971) of infrared radiation, which is transmitted through a magnetic recording track, to reproduce a previously exposed and processed optical photographic sound track.

Also known in the art are techniques such as those described in U.S. Pat. Nos. 2,819,963 and 3,157,500—both assigned to the instant assignee—which teach the use of a magnetic medium in combination with a photographic medium: In one case (U.S. Pat. No. 2,819,963), selective bonding of magnetic particles to a support occurs, whereby electrophotographic copying may obtain; in the other case (U.S. Pat. No. 3,157,500), the selective removal of parts of the magnetic medium, under action of a strong magnetic field, is taught. The present invention does not relate to any combination of magnetic and photographic media in which the magnetic medium, as a result of photographic processing, or otherwise, is selectively removed from the photographic medium.

As indicated in the aforesaid copending application Ser. No. 122,147, there are many and varied ways in which a photographic product, having a transparent magnetic coating, may be put to advantageous use.

SUMMARY OF THE INVENTION

Although there are several ways to indicate the concepts of the invention, it is considered that the invention is perhaps best identified in relation to matters bearing on "granularity": Thus, the invention teaches, among other things, that by matching the granularity of a magnetic recording medium to the granularity of a photographic medium, the magnetic recording medium—when uniformly spread with respect to the photographic medium—becomes, in a photographic sense, transparent.

Various indices, or tests, are available—and will be discussed later—for indicating the requisite matching of the granularity of the magnetic recording medium to the granularity of the photographic medium.

The invention will be described with reference to the figures, wherein:

FIGS. 1A through 1F are illustrations useful for describing various photographic product forms according to the invention, and FIG. 2 is a set of curves which are useful for defining the invention, granularity-wise, in terms of Wiener spectra.

Before identifying the correlation that obtains between the granularities of photographic and magnetic recording media, when practicing the invention, a brief discussion of the individual photographic and magnetic media is considered advisable.

Photographic medium

The photographic medium employed in practicing the invention is a photosensitive coating or stratum. The coating or stratum may be applied to a transparent support (e.g., a sheet or the like of polyethylene terephthalate, etc.) or to an opaque support (a sheet or the like of paper, or aluminum plate); and the coating or stratum may comprise silver or non-silver photosensitive material (e.g., diazo, organic photoconductors, zinc oxide, titanium oxide, radiation sensitive resins, radiation sensitive iron compounds, radiation sensitive bichromated colloids), and may be disposed to provide black-and-white or color images. The transparency or opaqueness of the support will depend on the indicated use thereof: e.g., transparent supports to be used for conventional photographic negatives; paper supports to be used for photographic prints, etc.

Magnetic recording medium

The magnetic recording medium employed in practicing the invention is a distribution or dispersion of magnetic particles across (but not necessarily atop) the image area of the above-described photographic medium. Magnetic particles may be of iron, nickel, cobalt—and oxides thereof—chromium dioxide, various ferrites, etc., or various combinations thereof, which will exhibit suitable magnetic properties for the recording of information. As used herein, the term "particle" is to be taken to mean a coherent physical entity which may be an agglomerate of discrete magnetic crystals; typically, such crystals may be as small as one micron or less.

FIGS. 1A through 1F indicate various embodiments of the invention, and such embodiments present various respective advantages, e.g., high gain recording and playback, easy coating procedures, optical and chemical advantages, etc.

FIG 1A indicates a base B having a photographic coating E thereon, and over which a coating M of magnetic material is applied;

FIG. 1B indicates the coating of magnetic material sandwiched between the base and photographic coating;

FIG. 1C indicates the base being coated with magnetic and photographic coatings on its oposite faces . . . the advantage of the invention as indicated in FIG. 1C being principally when used with a transparent base;

FIG. 1D indicates that the magnetic and photographic coatings may be mixed together for coating on the base;

FIG. 1E indicates that the photographic coating may be applied to a base which includes therein a distribution or dispersion of magnetic particles; and FIG. 1F indicates that the magnetic coating may be applied to a transparent base B', and then used in cooperation with a conventional photographic product, either before or after the photographic product has been developed.

The invention, hereafter, will be described in relation to a product as depicted in FIG. 1C (although, of course, it may be practiced with any of the other indicated embodiments): A dispersion of finely divided magnetically susceptible particles is prepared in a suitable transparent binder, such as cellulose ester or gelatin, along with a solvent for the binder such as an organic solvent for cellulose ester, or water for gelatin. The dispersion is spread across (the term "across" as used herein shall be construed to mean any spreading of particles as indicated in, or suggested by, any of the FIGS. 1A through 1F) the area of the film base on the side thereof opposite the photosensitive emulsion side, using any conventional spreading device, and then the solvent is allowed to evaporate.

Whether an article so produced is useful for both photographically and magnetically registering information depends, in a sense, on the size distribution and concentration of the magnetic particles; and, in another sense, on the relationship between the granularities of the magnetic and photographic coatings. Generally, the coarser the grain of the photographic product that is to support a magnetic recording medium, the larger the mean size of the magnetic particles which can be tolerated, and vice versa. Several tests are suggested for identifying the practice of the invention; and, as will be indicated in the claims hereof, products which meet any, or all, of such tests are within the scope of the invention.

TEST I

It has been found that a particle distribution or concentration between about 0.0004 and 0.3 grams per 1,000 square centimeter (of a sample which is, say, one square centimeter) when uniformly distributed across the desired area of a photographic product will, according to tthe invention, be sufficiently photographically transparent, provided the maximum particle size is less than about 40 microns and only a small percentage of particles are so much larger than the mean as to represent objectionable included dirt; and such product will be especially useful if the maximum particle size is less than about 10 microns. Particle distributions less than about 0.0004 grams per 1,000 square centimeters tend to be too thin for magnetic recording purposes, and particle distributions greater than about 0.3 grams per 1,000 square centimeters tend to be too dense for photographic purposes.

TEST II

The literature describes the use of Wiener spectra for analyzing matters of granularity. See Journal of the Optical Society of America, vol. 52, No. 6, pp. 669 through 672, "Wiener-Spectrum Analysis of Photographic Granularity," by Edward C. Doerner; The Theory of the Photographic Process, Third Edition, by C. E. Kenneth Mees and T. H. James, 1966. The Macmillan Company, New York, N.Y.; and Photographic Science and Engineering, vol. 15, No. 2, March-April 1971, pp. 106 through 118, "Methods for Analyzing the Photographic System, Including the Effects of Nonlinearity and Spatial Frequency Response," by G. C. Higgins. Basically, a Wiener spectrum for a photographic product is produced by Fourier analyzing the output of a microdensitometer employed to examine the granularity of the product by a traversing scan—such product being exposed and developed, say, to a net density of 1.0 (net density may be defined as the gross density of a product less the density of the support for such product). The curves A and B of FIG. 2 are Wiener spectra, respectively, for extremely coarse-grained photographic film, such as a film support coated with a silver bromoiodide gelatin emulsion at a coverage of 57 mg. of silver per square decimeter, and 71 mg. of gelatin per square decimeter (average grain size 1.5 microns), and for extremely fine-grained photographic film, such as a film support coated with a silver bromoiodide gelatin emulsion at a coverage of 15.8 mg. of silver per square decimeter, and 30 mg. of gelatin per square decimeter (average grain size 0.16 microns). Curves C, D, and E are Wiener spectra for the combination of the above noted fine-grained film with various magnetic overcoats which are progressively more concentrated, the particles of such overcoats being generally sized less than about 10 microns. Increasing the concentration of the overcoat has the effect of increasing the density of the coated film and, most importantly, by the addition of more and more of the magnetic overcoat to the fine-grained film, the Wiener spectra thereof gradually approaches the Wiener spectrum of the above-noted coarse-grained film. It is assumed, of course, that the same microdensitometer-wave analyzer setup is employed for producing all such spectra. And, according to the invention, any combination of photographic and magnetic media on a film support which has a Wiener spectrum that substantially coincides with (above or below), or is less than, i.e., falls below, the Wiener spectrum for the coarse-grained film will be useful from both photographic and magnetic recording standpoints, and will thus, as noted in the claims hereof, be within the scope of the invention. (Although a particular coarse-grained film has been indicated herein, it is to be realized that an equivalent of such film may be used in its stead.)

Though Test II has particular relevance in connection with kinds of products having transparent film supports, it may be adapted as well to kinds of products having paper and other supports. Thus, by identifying the coarsest version of a given kind of product, hereinafter referred to as a coarse standard, a Wiener spectrum for such coarse standard may be produced for comparison, as above, with the Wiener spectrum of a like product having both magnetic and photographic media.

TEST III

This test for identifying the practice of the invention relates to Root Mean Square (RMS) values of granularity, and to shifts thereof which are caused by the addition of a magnetic medium to a photographic medium. Test III requires two samples of a product having photographic and magnetic recording media: The first sample is exposed and photographically developed, say, to a density of one. The RMS value of granularity is determined for the composite of the two media of the first sample, for example, by the method described in "Kodak Plates and Films for Science and Industry," Kodak Publication No. P–9, page 12d. Then the second sample is so developed photographically that the density of the photographic medium of the second sample is essentially zero, i.e., the photographic medium is totally fixed out. The RMS value of granularity of the developed second sample (which basically is the granularity of the magnetic recording medium) is then determined; and then the RMS value of granularity for the photographic medium is determined by subtracting the RMS granularity value of the magnetic recording medium from the composite RMS granularity value. So long as the RMS value of granularity as determined for the first sample is less than four times as great as the RMS value of granularity for the photographic medium, the photographic medium of the composite photographic and magnetic media will be useful for photographic purposes, although it is considered preferable to limit the disparities between the composite and photographic RMS granularity values so that the composite granularity value is less than twice the photographic granularity value. In fact, by employing a magnetic medium which so limits the RMS value of granularity for the composite of the two media that such RMS granularity value is less than about 1.25 times as great as the RMS granularity value for the photographic medium, the difference between the granularities of the two samples will not be noticeable in ordinary use.

Examples of preferred formulations for, and products characterizing, the invention in the manner depicted in FIG. 1C are prepared as follows:

THE SPECIFIC EMBODIMENTS

Example 1

A dispersion of finely divided gamma ferric oxide crystals is made up by suitably milling 40 parts by weight of a suitable ferric oxide (having a crystal size distribution generally less than 1 micron) in 60 parts by weight of a water-ethanol solution, and then diluting with water to form a dispersion containing 10 percent by weight of ferric oxide.

500 grams of the above dispersion are mixed intimately with 50 grams of a gelatin-water dispersion containing 10 percent of gelatin by weight, and the resulting material is coated thinly on essentially the entire area of one side of a poly(ethylene terephthalate) photographic film having a substrate prepared to promote adhesion by any of the procedures well known in the art, and carrying a photographic emulsion on its opposite side, so as to provide about 0.004 gram of ferric oxide particles per 1,000 square centimeters of film area, after which the film is cooled to set the gelatin, and excess water and alcohol are allowed to evaporate.

Example 2

A dispersion is made up by milling together the following ingredients:

|  | Grams |
|---|---|
| Gamma ferric oxide | 460 |
| 40–60 second cellulose nitrate | 110 |
| 2-ethoxyethanol | 206 |
| Amyl acetate | 380 |
| Methyl ethyl ketone | 1200 |
| Tricresyl phosphate | 86 |

10 grams of the above dispersion are mixed intimately with 100 grams of methyl ethyl ketone and 120 grams of nitrate dope having the following composition by weight:

|  | Percent |
|---|---|
| 40–60 second cellulose nitrate | 15 |
| 2-ethoxyethanol | 28 |
| Amyl acetate | 51.7 |
| Ethanol | Balance |

The resulting material is coated thinly on essentially the entire area of one side of a poly(ethylene terephthalate) base photographic film carrying photographic emulsion on its opposite side, so as to provide 0.004 gram of oxide particles per 1,000 square centimeters of film area.

Coatings described in Examples 1 and 2 are characterized by an average optical density attributable to the magnetic particles of less than 0.13, and by full band magnetic sine wave signal to noise capabilities of 10 decibels or greater, and by a 15 to 20 decibel capability for digital data.

The invention has been described in detail with particular reference to preferred embodiments thereof, but it will be understood that variations and modifications can be effected within the spirit and scope of the invention. For example, it is to be realized that the photographic medium may not only be in the form of, say, a yet-to-be-exposed photosensitive layer, or the like, but the photographic medium may be an exposed, but not yet developed, photographic medium—or it may be an exposed, and developed, photographic medium, or the like.

The silver halide emulsions used in accordance with this invention can comprise, for example, silver chloride, silver bromide, silver bromoiodide, silver chlorobromide, silver chloroiodide, silver chlorobromoiodide crystals or mixtures thereof. The emulsions may be coarse or fine grain emulsions prepared by any of the well-known techniques, e.g., single jet emulsions such as those described in Trivelli and Smith, The Photographic Journal, Volume LXXIX, May 1939 (pages 330 through 338), double jet emulsions such as Lippmann emulsions, ammoniacal emulsions, thiocyanate or thioether ripened emulsions such as those described in Nietz et al., U.S. Pat. No. 2,222,264, issued Nov. 19, 1940; Illingsworth, U.S. Pat. No. 3,320,069, issued May 16, 1967; and McBride, U.S. Pat. No. 3,271,157, issued Sept. 6, 1966. Surface image emulsions may be used or internal image emulsions may be used, such as those described in Davey et al., U.S. Pat. No. 2,592,250, issued May 8, 1952; Porter et al., U.S. Pat. No. 3,206,313, issued Sept. 14, 1965; Berriman, U.S. Pat. No. 3,367,778, issued Feb. 6, 1968; and Bacon et al., U.S. Pat. No. 3,447,927, issued June 3, 1969. If desired, mixtures of surface and internal image emulsions may be used as described in Luckey et al., U.S. Pat. No. 2,996,382, issued Aug. 15, 1961. The emulsions may be regular grain emulsions, such as the type described in Klein and Moisar, J. Phot. Sci., vol. 12, No. 5, September/October 1964, pp. 242 through 251. Negative type emulsions may be used or direct positive emulsions may be used, such as those described in Leermakers, U.S. Pat. No. 2,184,013, issued Dec. 19, 1939; Kendall et al., U.S. Pat. No. 2,541,472, issued Feb. 13, 1951; Berriman, U.S. Pat. No. 3,367,778, issued Feb. 6, 1968; Schouwenaars, British Pat. No. 723,019, issued Feb. 2, 1955; Illingsworth et al., French Pat. No. 1,520,821, issued Mar. 4, 1968; Illingsworth, U.S. Pat. No. 3,501,307, issued Mar. 17, 1970; Ives, U.S. Pat. No. 2,563,785, issued Aug. 7, 1951; Knott et al., U.S. Pat. No. 2,456,953, issued Dec. 21, 1948; and Land, U.S. Pat. No. 2,861,885, issued Nov. 25, 1958.

The emulsions used with this invention may be sensitized with chemical sensitizers, such as with reducing agents; sulfur, selenium or tellurium compounds; gold, platinum, or palladium compounds; or combinations of these. Suitable procedures are described in Sheppard et al., U.S. Pat. No. 1,623,499, issued Apr. 5, 1927; Waller et al., U.S. Pat. No. 2,399,083, issued Apr. 23, 1946; McVeigh, U.S. Pat. No. 3,297,447, issued Jan. 10, 1967; and Dunn, U.S. Pat. No. 3,297,446, issued Jan. 10, 1967.

The silver halide emulsions used in the practice of this invention can be protected against the production of fog and can be stabilized against loss of sensitivity during keeping. Suitable antifoggants and stabilizers each used alone or in combination include thiazolium salts described in Brooker et al., U.S. Pat. No. 2,131,038, issued Sept. 27, 1938; and Allen et al., U.S. Pat. No. 2,694,716, issued Nov. 16, 1954; the azaindenes described in Piper, U.S. Pat. No. 2,886,437, issued May 12, 1959; and Heimbach et al., U.S. Pat. No. 2,444,605, issued July 6, 1948; the mercury salts as described in Allen et al., U.S. Pat. No. 2,728,663, issued Dec 27, 1955; the urazoles described in Anderson et al., U.S. Pat. No. 3,287,135, issued Nov. 22, 1966; the sulfocatechols described in Kennard et al., U.S. Pat. No. 3,236,652, issued Feb. 22, 1966; the oximes described in Carroll et al., British Pat. No. 623,448, issued May 18, 1949; nitron; nitroindazoles; the mercaptotetrazoles described in Kendall et al., U.S. Pat. No. 2,403,927, issued July 16, 1946; Kennard et al., U.S. Pat. No. 3,266,897, issued Aug. 16, 1966; and Luckey et al., U.S. Pat. No. 3,397,987, issued Aug. 20, 1968; the polyvalent metal salts described in Jones, U.S. Pat. No. 2,839,405, issued June 17, 1958; the thiouronium salts described in Herz et al., U.S. Pat. No. 3,220,839, issued Nov. 30, 1965; the palladium, platinum, and gold salts described in Trivelli et al., U.S. Pat. No. 2,566,263, issued Aug. 28, 1951; and Yutzy et al., U.S. Pat. No. 2,597,915, issued May 27, 1952.

The photographic elements of this invention may contain incorporated developing agents such as hydroquinones, catechols, aminophenols, 3-pyrazolidones, ascorbic acid and its derivatives, reductones and phenylenediamines. Combinations of developing agents can be employed in the practice of the invention. The developing agents can be in a silver halide emulsion and/or in another suitable location in the photographic element. The developing agents may be added from suitable solvents or in the form of dispersions as described in Yackel, U.S. Pat. No. 2,592,368, issued Apr. 8, 1952; and Dunn et al., French Pat. No. 1,505,778.

The photographic and other hardenable layers used in the practice of this invention can be hardened by various organic or inorganic hardeners, alone or in combination, such as the aldehydes, and blocked aldehydes as described in Allen et al., U.S. Pat. No. 3,232,764, issued Feb. 1, 1966, ketones, carboxylic and carbonic acid derivatives, sulfonate esters, sulfonyl halides and vinyl sulfonyl ethers as described in Burness et al., U.S. Pat. No. 3,529,644, issued Nov. 10, 1970, active halogen compounds, epoxy compounds, aziridines, active olefins, isocyanates, carbodiimides, polymeric hardeners such as oxidized polysaccharides like dialdehyde starch and oxyguargum and the like.

The photographic emulsions and elements described in the practice of this invention can contain various colloids alone or in combination as vehicles, binding agents, and various layers. Suitable hydrophilic materials include both naturally-occurring substances such as proteins, for example, gelatin, gelatin derivatives, cellulose derivatives, polysaccharides such as dextran, gum arabic and the like; and synthetic polymeric substances such as water soluble polyvinyl compounds like poly(vinylpyrrolidone), acrylamide polymers and the like.

The described photographic emulsion layers and other layers of a photographic element employed in the practice of this invention can also contain alone or in combination with hydrophilic, water permeable colloids, other synthetic polymeric compounds such as dispersed vinyl compounds such as in latex form and particularly those which increase the dimensional stability of the photographic materials. Suitable synthetic polymers include those described, for example, in Nottorf, U.S. Pat. No. 3,142,568, issued July 28, 1964; White, U.S. Pat. No. 3,193,386, issued July 6, 1965; Houck et al., U.S. Pat. No. 3,062,674, issued Nov. 6, 1962; Houck et al., U.S. Pat. No. 3,220,844, issued Nov. 30, 1965; Ream et al., U.S. Pat. No. 3,287,289, issued Nov. 22, 1966; and Dykstra, U.S. Pat. No. 3,411,911, issued Nov. 19, 1968. Particularly effective are those water-insoluble polymers of alkyl acrylates and methacrylates, acrylic acid, sulfoalkyl acrylates or methacrylates, those which have cross-linking sites which facilitate hardening or curing described in Smith, U.S. Pat. No. 3,488,708, issued Jan. 6, 1970, and those having recurring sulfobetaine units as described in Dykstra, Canadian Pat. No. 774,054.

The photographic elements used with this invention may contain antistatic or conducting layers; such layers may comprise soluble salts, e.g., chlorides, nitrates, etc., evaporated metal layers, ionic polymers such as those described in Minsk, U.S. Pat. No. 2,861,056, issued Nov. 18, 1958 and Sterman et al., U.S. Pat. No. 3,206,312, issued Sept. 14, 1965, or insoluble inorganic salts such as those described in Trevoy, U.S. Pat. No. 3,428,451, issued Feb. 18, 1969.

The photographic layers and other layers of a photographic element employed and described herein can be coated on a wide variety of supports. Typical supports include cellulose nitrate film, cellulose ester film, poly(vinyl acetal) film, polystyrene film, poly(ethylene terephthalate) film, polycarbonate film and related films or resinous materials, as well as glass, paper, metal, and the like. Typically, a flexible support is employed, especially a paper support, which can be partially acetylated or coated with baryta and/or an alpha-olefin polymer, particularly a polymer of an alpha-olefin containing 2 to 10 carbon atoms such as polyethylene, polypropylene, ethylenebutene copolymers, and the like.

The photographic layers employed in the practice of this invention can contain plasticizers and lubricants such as polyalcohols, e.g., glycerin and diols of the type described in Milton et al., U.S. Pat. No. 2,960,404, issued Nov. 1, 1966; fatty acids or esters such as those described in Robijns, U.S. Pat. No. 2,588,765, issued Apr. 11, 1952, and Duane, U.S. Pat. No. 3,121,060, issued Feb. 11, 1964; and silicone resins such as those described in Du Pont, British Pat No. 955,061, issued Apr. 15, 1964.

The photographic layers employed in the practice of this invention may contain surfactants such as saponin; anionic compounds such as the alkyl aryl sulfonates described in Baldsiefen, U.S. Pat. No. 2,600,831, issued June 17, 1952; amphoteric compounds such as those described in Ben-Ezra, U.S. Pat. No. 3,133,816, issued May 19, 1964; and water soluble adducts of glycidol and an alkyl phenol such as those described in Olin Mathieson, British Pat. No. 1,022,878, issued Mar. 16, 1966; and Knox, U.S. Pat. No. 3,514,293, issued May 26, 1970.

The photographic elements employed in the practice of this invention may contain matting agents such as starch, titanium dioxide, zinc oxide, silica, polymeric beads including beads of the type described in Jelley, U.S. Pat. No. 2,992,101, issued July 11, 1961, and Lynn, U.S. Pat. No. 2,701,245, issued Feb. 1, 1955; and alkali soluble polymeric particles of the type described in Jelley et al., U.S. Pat. No. 2,992,101.

Spectral sensitizing dyes can be used conveniently to confer additional sensitivity to the light sensitive silver halide emulsion of the multi-layer photographic elements of the invention. For instance, additional spectral sensitization can be obtained by treating the emulsion with a solution of a sensitizing dye in an organic solvent or the dye may be added in the form of a dispersion as described in Owens et al., British Pat. No. 1,154,781, issued June 11, 1969. For optimum results, the dye may either be added to the emulsion as a final step or at some earlier stage.

Sensitizing dyes useful in sensitizing such emulsions are described, for example, in Brooker et al., U.S. Pat. No. 2,526,632, issued Oct. 24, 1950; Sprague, U.S. Pat. No. 2,503,776, issued Apr. 11, 1950; Brooker et al., U.S. Pat. No. 2,493,748, issued Jan. 10, 1950; and Taber et al., U.S. Pat. No. 3,384,486, issued May 21, 1968. Spectral sensitizers which can be used include the cyanines, merocyanines, complex (tri- or tetranuclear) merocyanines, complex (tri- or tetranuclear) cyanines, holopolar cyanines, styryls, hemicyanines (e.g., enamine hemicyanines), oxonols and hemioxonols.

Dyes of the cyanine classes may contain such basic nuclei as the thiazolines, oxazolines, pyrrolines, pyridines, oxazoles, thiazoles selenazoles and imidazoles. Such nuclei may contain alkyl, alkylene, hydroxyalkyl, sulfoalkyl, carboxyalkyl, aminoalkyl and enamine groups and may be fused to carbocyclic or heterocyclic ring systems either unsubstituted or substituted with halogen, phenyl, alkyl, haloalkyl, cyano, or alkoxy groups. The dyes may be symmetrical or unsymmetrical and may contain alkyl, phenyl, enamine or heterocyclic substituents on the methine or polymethine chain.

The merocyanine dyes may contain the basic nuclei mentioned above as well as acid nuclei such as thiohydantoins, rhodanines, oxazolidenediones, thiazolidenediones, barbituric acids, thiazolineones, and malonitrile. These acid nuclei may be substituted with alkyl, alkylene, phenyl, carboxyalkyl, sulfoalkyl, hydroxyalkyl, alkoxyalkyl, alkylamino groups, or heterocyclic nuclei. Combinations of these dyes may be used, if desired. In addition, supersensitizing addenda which do not absorb visible light may be included, for instance, ascorbic acid derivatives, azaindenes, cadmium salts, and organic sulfonic acids as described in McFall et al., U.S. Pat. No. 2,933,390, issued Apr. 19, 1960; and Jones et al., U.S. Pat. No 2,937,089, issued May 17, 1960.

The various layers, including the photographic layers employed in the practice of this invention, can contain light absorbing materials and filter dyes such as those described in Sawdey, U.S. Pat. No. 3,253,921, issued May 31, 1966; Gaspar, U.S. Pat. No. 2,274,782, issued Mar. 3, 1942; Silberstein et al., U.S. Pat. No. 2,527,583, issued Oct. 31, 1950; and Van Campen, U.S. Pat. No. 2,956,879, issued Oct. 18, 1960. If desired, the dyes can be mordanted, for example, as described in Jones et al., U.S. Pat. No. 3,282,699, issued Nov. 1, 1966.

The photographic layers used in the practice of this invention may be coated by various coating procedures including dip coating, air knife coating, curtain coating, or extrusion coating using hoppers of the type described in Beguin, U.S. Pat. No. 2,681,294, issued June 15, 1954. If desired, two or more layers may be coated simultaneously by the procedures described in Russell, U.S. Pat. No. 2,761,791, issued Sept. 4, 1956; Hughes, U.S. Pat. No. 3,508,947, issued Apr. 28, 1970; and Wynn, British Pat. No. 837,095, issued June 9, 1960. This invention can also be used for silver halide layers coated by vacuum evaporation as described in British Pat. No. 968,453, issued Sept. 2, 1964, and Lu Valle et al., U.S. Pat. No. 3,219,451, issued Nov. 23, 1965.

This invention may be used in elements designed for recording print-out images as described in Fallesen, U.S. Pat. No. 2,369,449, issued Feb. 13, 1945, or Bacon et al., U.S. Pat. No. 3,447,927, issued June 3, 1969; direct print images as described in Hunt, U.S. Pat. No. 3,033,682, issued May 8, 1962, and McBride, U.S. Pat. No. 3,287,137, issued Nov. 22, 1966; elements designed for processing by heat as described in Sorensen et al., U.S. Pat. No. 3,152,904, issued Oct. 13, 1964; Morgan et al., U.S. Pat. No. 3,457,075, issued July 22, 1969; Stewart et al., U.S. Pat. No. 3,312,550, issued Apr. 4, 1967; Colt, U.S. Pat. No. 3,418,122, issued Dec. 24, 1968; Yutzy et al., U.S. Pat. No. 3,392,020, issued Feb. 8, 1965; Humphlett et al., U.S. Pat. No. 3,301,678, issued Jan. 31, 1967; and Haist et al., U.S. Pat. No. 3,531,285, issued Sept 29, 1970.

This invention may be used in elements designed for physical development, such as those described in Agfa, British Pat. No. 920,277, issued Mar. 6, 1963; Gilman et al., British Pat. No. 1,131,238, issued Oct. 23, 1968; and Kodak, Belgian Pat. No. 718,019, granted Jan. 13, 1969.

This invention may be used with elements designed for color photography, for example, elements containing color-forming couplers such as those described in Frohlich et al., U.S. Pat. No. 2,376,679, issued May 22, 1945; Jelley et al., U.S. Pat. No. 2,322,027, issued June 15, 1943; Fierke et al., U.S. Pat. No. 2,801,171, issued July 30, 1957; Godowsky, U.S. Pat. No. 2,698,794, issued Jan. 4, 1955; Barr et al., U.S. Pat. No. 3,227,554, issued Jan. 4, 1966; Graham et al., U.S. Pat No 3,046,129, issued July 24, 1962; Vittum et al., U.S. Pat. No. 2,360,290, issued Oct. 10, 1944; and Thirtle et al., U.S. Pat. No. 2,701,197, issued Feb. 1, 1955; or elements to be developed in solutions containing color-forming couplers such as those described in Mannes et al., U.S. Pat. No. 2,252,718, issued Aug. 19, 1941; Carroll et al., U.S. Pat. No. 2,592,243, issued Apr. 18, 1952; and Schwan et al., U.S. Pat. No. 2,950,970, issued Aug. 30, 1966; and in false-sensitized color materials such as those described in Hanson, U.S. Pat. No. 2,763,549, issued Sept. 18, 1956.

Photographic elements prepared according to this invention can be processed by various methods including processing in alkaline solutions containing conventional developing agents such as hydroquinones, catechols, aminophenols, 3-pyrazolidones, phenylenediamines, ascorbic acid derivatives, hydroxylamines, hydrazines, reductones and the like; web processing such as described in Tregillus et al., U.S. Pat. No. 3,179,517, issued Apr. 20, 1965; stabilization processing as described in Russell et al., "Stabilization Processing of Films and Paper," PSA Journal, Volume 16B, August 1950; monobath processing as described in Levy "Combined Development and Fixation of Photographic Images with Monobaths," Phot. Sci. and Eng., vol. 2, No. 3, October 1958, and Barnes et al., U.S. Pat. No. 3,392,019, issued July 9, 1968. If desired, the photographic elements of this invention can be processed in hardening developers such as those described in Allen et al., U.S. Pat. No. 3,232,761, issued Feb. 1, 1966; in roller transport processors such as those described in Russell et al., U.S. Pat. No. 3,025,779, issued Mar. 20, 1962; or by surface application processing as described in Example 3 of Kitze, U.S. Pat. No. 3, 418,132, issued Dec. 24, 1968.

The silver halide emulsions used with this invention can be used to prepare photographic elements designed for developing out processing, or print-out exposure as described in Fallesen, U.S. Pat. No. 2,369,449, issued Feb. 13, 1945; or for photodevelopment as described in Hunt, U.S. Pat. No. 3,033,678, issued May 8, 1962; McBride, U.S. Pat. No. 3,287,137, isued Nov. 22, 1966; and Colt, U.S. Pat. No. 3,418,122, issued Dec. 24, 1968.

What is claimed is:

1. A photographic product having a photographic layer of a type intended for processing according to a predetermined method to produce a visible image on said product, comprising:
    (a) a photographic layer,
    (b) a plurality of magnetic particles, and
    (c) means for maintaining said particles in a uniform distribution across the image area of said photographic layer viewable with said image after said photographic layer has been developed photographically in accordance with said method, the distribution of said particles being sufficiently dispersed to permit substantial transmittance of visible light therethrough to said photographic layer.

2. The product of claim 1 wherein said photographic layer is a photosensitive layer.

3. The product of claim 2 wherein the distribution of said particles across said image area is such that the Wiener spectrum for said product is substantially the same as, or generally less than, the Wiener spectrum for the coarse standard for said product, when both said product and said coarse standard have been photographically developed to the same net optical density.

4. The product of claim 1 wherein said photographic layer is a photographically developed photographic layer.

5. The product of claim 4 wherein the distribution of said particles across said image area is such that the Wiener spectrum for said product is substantially the same as, or less than, the Wiener spectrum for the coarse standard for said product, when both said product and said coarse standard have been photographically developed to the same net optical density.

6. The product of claim 1,
    (a) wherein the weight per unit area of the distribution of said particles across said image area is between about 0.0004 and 0.3 gram per 1,000 square centimeters, and
    (b) wherein the maximum size of said particles is rarely more than about 40 microns,
said unit area being about one square centimeter.

7. The product of claim 6 wherein said maximum size of said particles is les than about 10 microns.

8. The product of claim 1 wherein the distribution of said particles across said image area is such that the Wiener spectrum for said product is substantially the same as, or generally less than, the Wiener spectrum for the coarse standard for said product, when both said product and said coarse standard have been photographically developed to the same net optical density.

9. The product of claim 1 wherein the RMS value of granularity for the product is less than about four times the RMS value for the granularity of the photographic medium alone.

10. The product of claim 1 wherein the RMS valve of granularity for the product is less than about two times the RMS value for the granularity of the photographic layer alone.

11. The product of claim 1 wherein the RMS value of granularity for the product is less than about 1.25 times the RMS value for the granularity of the photographic medium alone.

12. The product of claim 1 wherein said plurality of magnetic particles is comprised of particles of gamma ferric oxide.

13. A photographic product comprising:
 (a) support means,
 (b) a photographic coating supported by said support means adapted to be developed to a visible image on said support means, and
 (c) a uniform distribution of magnetic particles, the concentration of which distribution is sufficiently thin as to render the distribution substantially transparent to visible light,
said distribution of magnetic particles being so supported by said support means that (1) said photographic coating may be viewed via said distribution, and (2) said distribution occupies substantially the full image area of said photographic coating after said coating has been photographically developed.

14. The product of claim 13 wherein:
 (a) said support means is transparent,
 (b) said photographic coating is photosensitive and said distribution of magnetic particles is in the form of a coating, said coating being comprised of a transparent binder for said magnetic particles.

15. The product of claim 13,
 (a) wherein said support means is substantially opaque,
 (b) wherein both said photographic coating and said distribution of magnetic particles are disposed on the same side of said support means, and
 (c) wherein said photographic coating is photosensitive.

16. A photographic product comprising:
 (a) a transparent support,
 (b) a photographic emulsion coat supported by said support, and
 (c) magnetic particles uniformly distributed across the photographic emulsion,
said uniform distribution being such that, after said emulsion has been photographically developed, the area defined by the Wiener spectrum for the composite of said photographic emulsion and said distribution of magnetic particles is substantially the same as, or generally less than, that defined by the Wiener spectrum for a sample of photographic film comprised of a film support coated with a silver bromoiodide gelatin emulsion at a coverage of 57 mg. of silver per square decimeter, and with 71 mg. of gelatin per square decimeter, or its equivalent, when both said sample and said composite have been photographically developed to a density of one, the grain size of said sample being, on the average, about 1.5 microns.

17. A photographic product having:
 (a) a support,
 (b) a photographic emulsion coating supported by said support, adapted to be developed to a visible image on said support, and
 (c) a coating having a uniform dispersion of magnetic particles therein, said coating being spread to occupy at least part of the image area of said emulsion coating viewable concurrently wtih said emulsion coating, and to form therewith a composite coating, said coating of magnetic particles being such that the RMS value of granularity for the composite coating is no more than four times as great as the RMS value for the granularity of said emulsion coating.

18. A photographic product according to claim 17 wherein the RMS value of granularity for the composite coating is no more than two times as great as the RMS value for the granularity of said emulsion coating.

19. A photographic product according to claim 17 wherein the RMS value of granularity for the composite coating is no more than 1.25 times as great as the RMS value for the granularity of said emulsion coating.

20. A photographic product comprising:
 (a) a base,
 (b) a photographic layer support by said base, and
 (c) a magnetic coating over said photographic layer, said magnetic coating comprising a distribution of magnetic particles which is sufficiently dispersed to permit the transmittance therethrough of visible light to said photographic layer.

21. A photographic product comprising:
 (a) a base,
 (b) a magnetic coating supported by said base, and
 (c) a photographic layer over said magnetic coating, said magnetic coating comprising a distribution of magnetic particles which is sufficiently dispersed to permit the transmittance therethrough of visible light.

22. A photographic product comprising:
 (a) a transparent base,
 (b) a photographic layer supported by one side of said base,
 (c) a magnetic coating supported by the other side of said base, said magnetic coating comprising a distribution of magnetic particles which is sufficiently dispersed to permit the transmittance therethrough of visible light.

23. Photographic film comprising a film base which is transparent to visible light;
 at least one layer of transparent gelatin on one side of said film base carrying photosensitive material therein;
 and magnetically susceptible particles in a binder on said one side distributed uniformly over the surface of said film, said magnetically susceptible particles being present in a distribution sufficiently thin that the transmittance of visible light through said film after exposure and development of said photosensitive layer is essentially unhindered by said particles while the capability for magnetic recording of information in and playback from said particles is preserved.

24. Photographic film in accordance with claim 23 wherein said particles are present in a distribution of between 0.0004 and 0.3 gram per square foot.

25. Photographic film in accordance with claim 23 wherein said magnetically susceptible particles are present in a distribution of about 0.004 gram per square foot.

26. Photographic film in accordance with claim 23 wherein said magnetically susceptible particles have a particle size smaller than 1 micron.

27. Photographic film in accordance with claim 23 wherein said binder is gelatin.

28. Photographic film in accordance with claim 27 wherein said magnetically susceptible particles are carried in a first gelatin layer coated on top of a second gelatin layer carrying said photosensitive material, said first gelatin layer acting to protect said second gelatin layer.

29. Photographic film in accordance with claim 23 wherein said binder is a synthetic resin.

30. Photographic film in accordance with claim 23 wherein said magnetically susceptible particles are magnetic $Fe_3O_4$.

31. Photographic film in accordance with claim 23 wherein said photosensitive material is unexposed.

32. A method for making photographic film having magnetic recording ability, as claimed in claim 23, comprising providing a transparent film base having a photosensitive layer on one surface thereof;

preparing a dispersion of finely divided magnetically susceptible particles in a solution comprising gelatin, and water as a solvent therefor;

applying a coating of said film base on top of said photo- the entire area of said film base on top of said photosensitive layer in quantity such as to distribute said magnetically susceptible particles in a distribution sufficiently thin that the transmittance of visible light through said film after development and exposure of said photosensitive layer is essentially unhindered by said particles while preserving recording and playback capability thereof; and allowing solvent to evaporate from said dispersion.

33. A method for recording on and retrieving from a single film both a photographic image and a magnetic record, said method comprising:

providing a photographic film comprising a film base which is transparent to visible light and carries on the same side thereof both a photosensitive layer and magnetically susceptible particles, said particles being uniformly distributed over the surface of said film in a distribution of between 0.0004 and 0.3 gram per square foot such that the transmission of visible light is essentially unhindered thereby;

recording information magnetically in said particles;

developing said film, thereby forming an image comprising areas thereon of varying transparency to visible light;

reproducing such image by transmitting visible light through said film; and magnetically reproducing such information from said particles.

References Cited

UNITED STATES PATENTS

| | | | |
|---|---|---|---|
| 2,564,312 | 8/1951 | Rossmann et al. | 96—39 |
| 3,526,542 | 9/1970 | Weise et al. | 117—239 |
| 3,157,500 | 10/1964 | Abbott et al. | 96—114.7 |
| 3,227,555 | 1/1966 | Van Norman | 96—39 |
| 3,554,794 | 1/1971 | Geisler et al. | 117—239 |
| 3,554,798 | 1/1971 | Nacci | 117—239 |

J. TRAVIS BROWN, Primary Examiner

R. L. SCHILLING, Assistant Examiner

U.S. Cl. X.R.

96—4, 39

PO-1050
(5/69)

UNITED STATES PATENT OFFICE
CERTIFICATE OF CORRECTION

Patent No. 3,782,947                        Dated January 1, 1974

Inventor(s)  H. J. Krall

It is certified that error appears in the above-identified patent and that said Letters Patent are hereby corrected as shown below:

Claim 32, lines 8 through 10, delete "applying a coating of said film base on top of said photo- the entire area of said film base on top of said photosensitive layer in quantity such as to distribute said" and substitute therefor --applying a coating of said dispersion over essentially the entire area of said film base on top of said photosensitive layer in quantity such as to distribute said --.

Signed and sealed this 15th day of April 1975.

(SEAL)
Attest:

RUTH C. MASON
Attesting Officer

C. MARSHALL DANN
Commissioner of Patents
and Trademarks